July 17, 1962 C. SCHNELL 3,044,514
COMMINUTING MACHINE
Filed Jan. 6, 1960 8 Sheets-Sheet 1

Inventor
Carl Schnell
By Merriam, Smith & Marshall
Attorneys

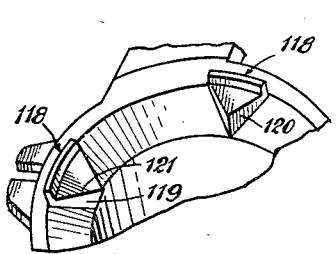
Fig.10
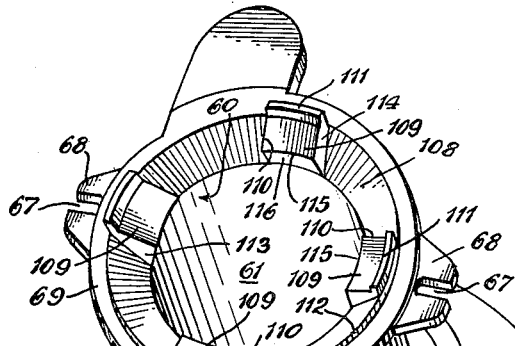
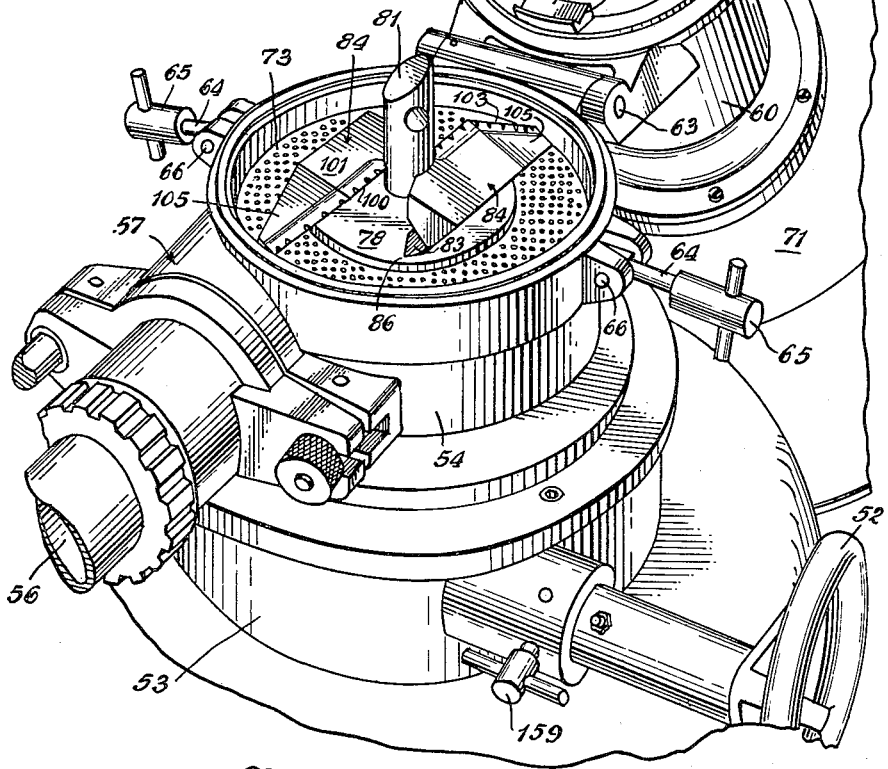
Fig.2
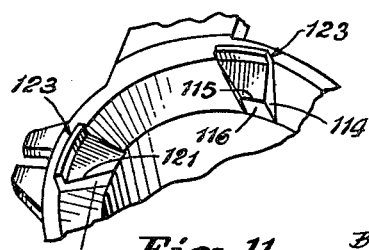
Fig.11
Inventor
Carl Schnell
By Merriam, Smith & Marshall
Attorneys July 17, 1962 C. SCHNELL 3,044,514
COMMINUTING MACHINE
Filed Jan. 6, 1960 8 Sheets-Sheet 3

Inventor
Carl Schnell
by Merriam, Smith & Marshall
Attorneys

Inventor
Carl Schnell

July 17, 1962

C. SCHNELL 3,044,514

COMMINUTING MACHINE

Filed Jan. 6, 1960

Inventor
Carl Schnell
By Merriam, Smith & Marshall
Attorneys

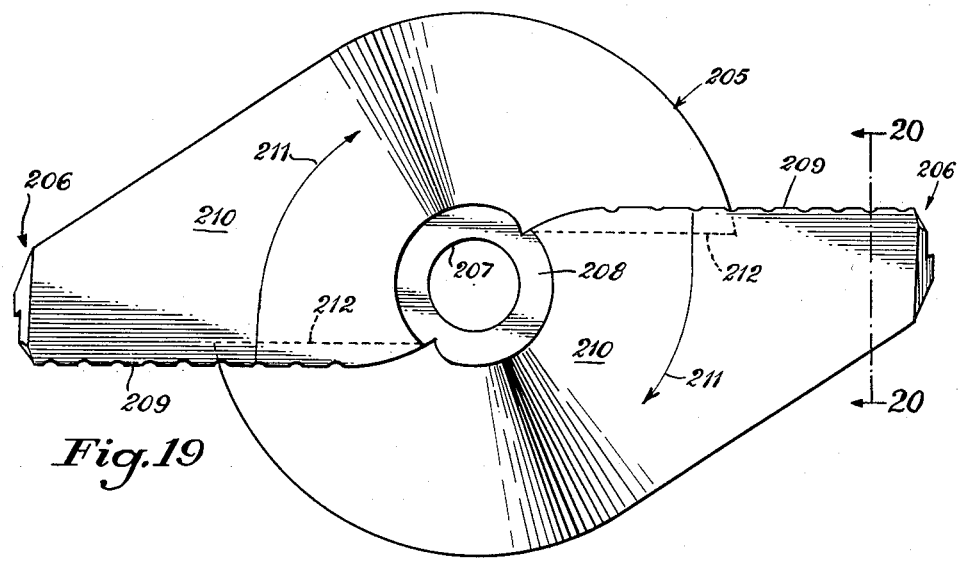
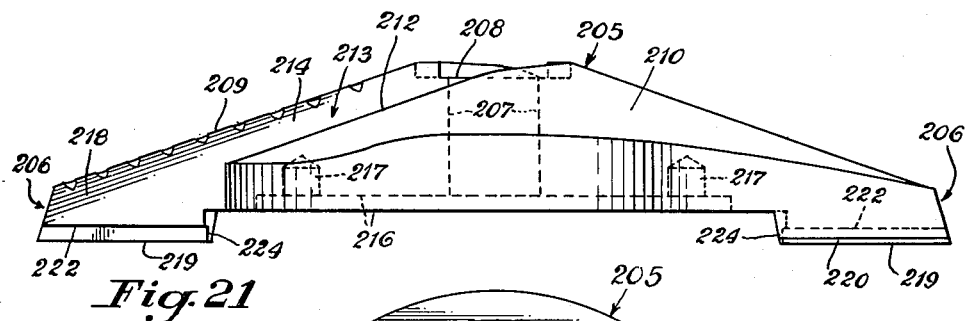
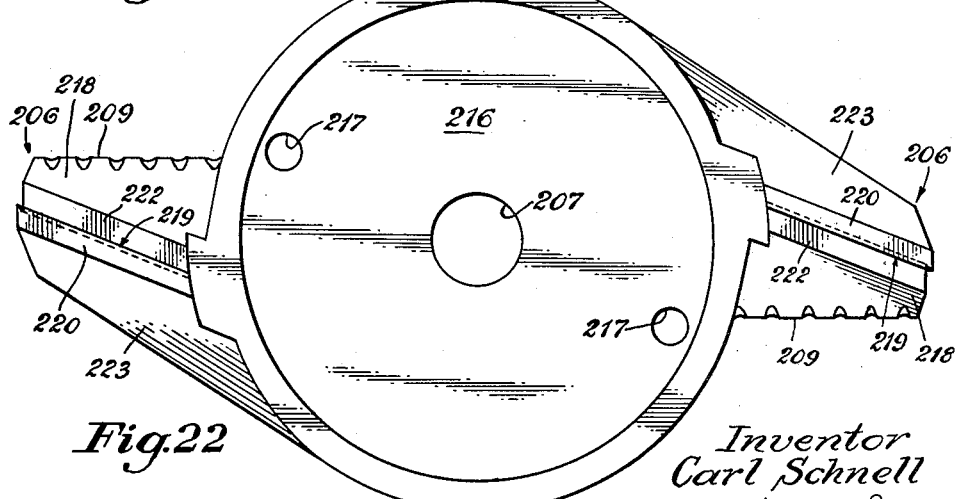

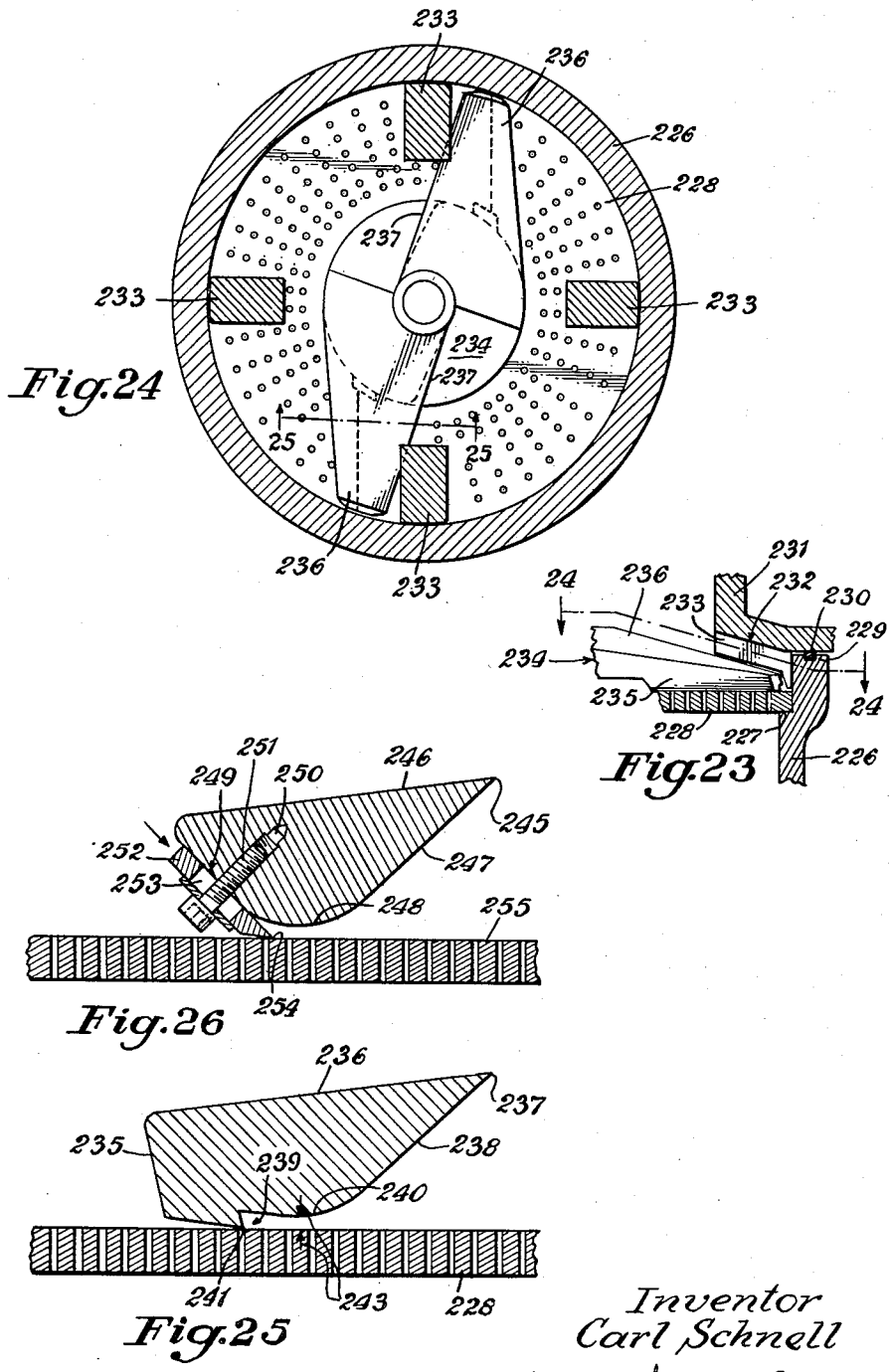

July 17, 1962  C. SCHNELL  3,044,514
COMMINUTING MACHINE
Filed Jan. 6, 1960  8 Sheets-Sheet 8

Inventor
Carl Schnell
By Merriam, Smith & Marshall
Attorneys

United States Patent Office 3,044,514
Patented July 17, 1962

3,044,514
COMMINUTING MACHINE
Carl Schnell, Winterbach, near Schorndorf-Wurttemberg, Germany, assignor of one-half to The Griffith Laboratories, Inc., Chicago, Ill., a corporation of Illinois
Filed Jan. 6, 1960, Ser. No. 859
Claims priority, application Germany Oct. 18, 1958
18 Claims. (Cl. 146—192)

The present invention relates to comminuting machines suitable for use in producing comminuted comestible products, and component parts thereof.

The present application is a continuation-in-part of Serial No. 807,350, filed April 20, 1959, now Patent No. 2,934,121.

The machines described herein are useful for comminuting many materials, especially agricultural and animal products, including meat emulsions for preparing sausages and the like.

For most purposes, raw meat material must be comminuted under conditions that avoid overheating it. It is important that the product be comminuted and discharged substantially free from ingress of air. It must be comminuted at a high rate of discharge or throughput without being subjected to an excessive temperature rise.

The present invention pertains to centrifugal, high speed comminuting machines, and component parts thereof.

The comminuting machines hereinafter described provide a feed chamber, comminuting chamber and discharge chamber, all of which may be sealed against ingress of air during operation. These machines are capable of producing a continuous hydraulic column of meat emulsion therein. As a result, the output of the machine is multiplied and an excessive temperature rise in the meat emulsion is avoided.

In the accompanying drawings, in which my invention is shown:

FIG. 2 is an enlarged perspective view of a portion of the machine in an open position and ready for the assembling or disassembling of certain parts;

FIG. 10 is a fragmentary view showing lugs that differ from those shown in FIG. 2;

FIG. 11 is a view similar to that of FIG. 10 showing a different form of lugs that includes features of the lugs shown in FIGS. 2 and 10;

FIG. 19 is an enlarged plan view, similar to that of FIG. 13, showing a different rotor;

FIG. 21 is an elevation view, similar to FIG. 14, of the rotor shown in FIG. 19;

FIG. 22 is a view, similar to FIG. 15, of the underside of the rotor shown in FIG. 19;

FIG. 23 is a fragmentary cross-sectional view showing a portion of the wall means that forms the comminuting chamber, a portion of a rotor arm and a portion of the plate shown in FIG. 24, and the modified lug embodiment shown in FIG. 24;

FIG. 24 is a plan view taken on the line 24—24 of FIG. 23 showing modified lugs and a modified rotor located in the comminuting portion;

FIG. 25 is an enlarged cross-sectional view, similar to FIGS. 18 and 20 taken on the line 25—25 of FIG. 24, and shows the relationship of the cutter or rotor arm to the perforate plate;

FIG. 26 is a cross-sectional view, similar to FIGS. 18, 20 and 25, of a modified cutter arm not previously shown having an adjustable blade that provides the trailing cutting edge, and shows a portion of the perforate plate;

Figure 1:
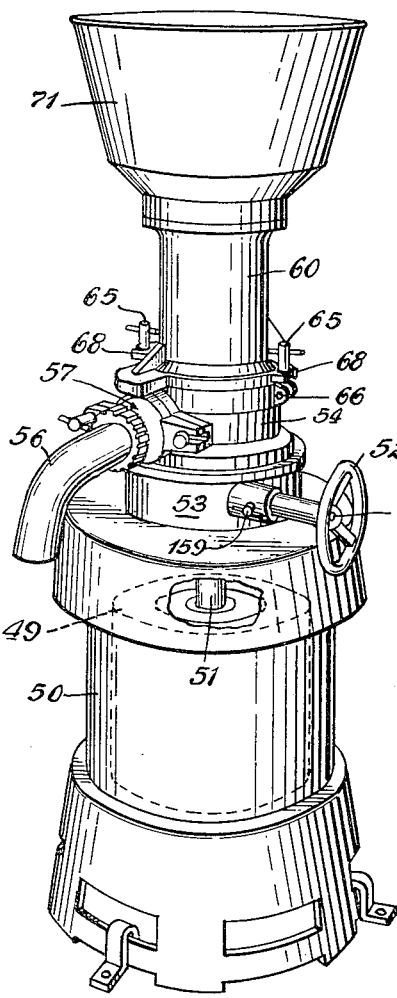
FIG. 1 is a perspective view of a machine as used.

FIGURE 1 shows an apparatus for comminuting comestible meat and agricultural products. When meat is used in this machine, a comestible emulsion is produced. This machine comprises wall means defining in advancing and communicating sequence a reservoir chamber with feeding inlet means, a comminuting chamber, and a discharge chamber with outlet means. The wall means is constructed and arranged to provide during operation of the apparatus a continuous and moving hydraulic column of material substantially free from ingress of air and extending from at least the entrance of the comminuting portion to said outlet means. A perforate plate made of rigid metal separates the comminuting and discharge chamber and has a multiplicity of fine or small tubular passageways therein.

Figure 4:
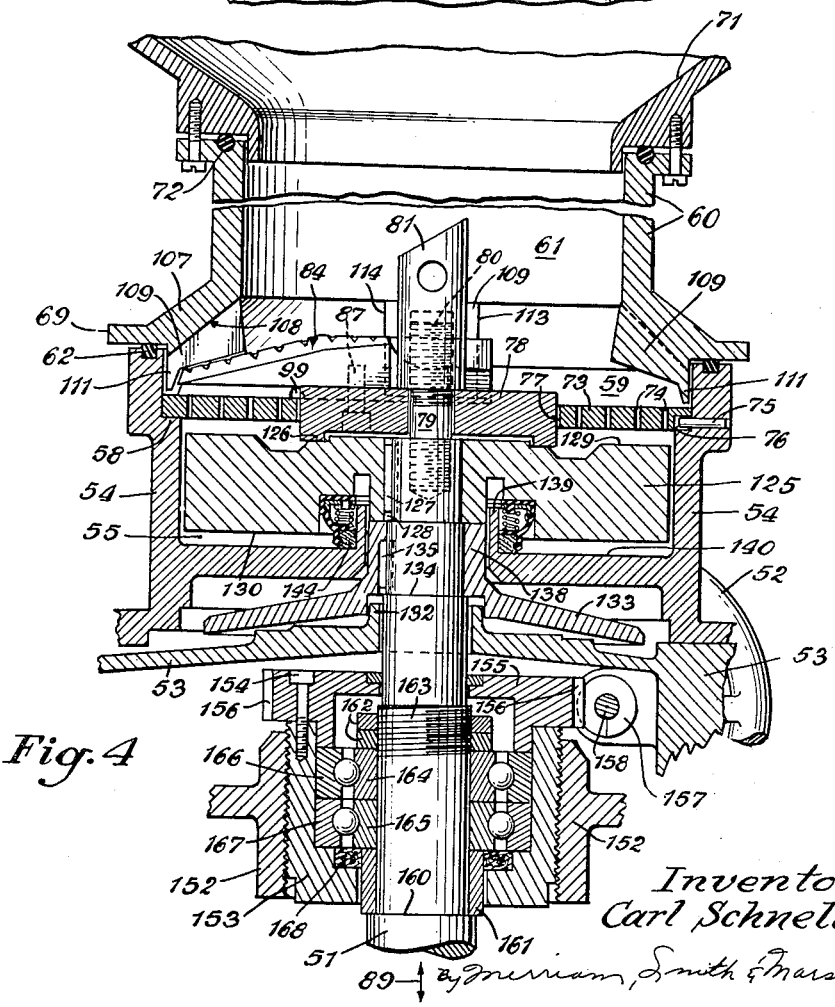
FIG. 4 is a cross-sectional view showing the rotor shown in FIG. 3 and other portions of the machine taken on line A—A of FIG. 3.

The machine shown in FIGURE 1 has a base 50 in which is fixed a powerful electric motor with wall means 49 and vertical motor shaft 51. The shaft may be raised and lowered relative to wall means 49 by turning handwheel 52. Wall means 54 provides chamber 55 containing a throw-out centrifugal rotor which forces material out the spout 56 from a tangential outlet 57. The wall means 54 provides an internal shoulder 58 (FIG. 4) for supporting a removable plate, above which wall means 54 provides chamber 59. Above the wall means 54 is wall means 60 which provides chamber 61. Wall means 60 fits tightly over wall means 54 and its packing ring 62 (FIG. 4). Wall means 60 is hinged at 63 (FIG. 2) to wall means 54 so that it may be swung in a vertical arc. Swinging bolts 64 have hand nuts 65 and are hinged at 66. These bolts fit into radial slots 67 in lugs 68 which extend from a bottom flange 69 of wall means 60. The top of chamber 61 is extended by a flaring funnel 71 (FIGS. 1 and 4). Funnel 71 is tightly sealed at its junction with chamber 61 by packing ring 72 (FIG. 4).

FIG. 4 shows a perforate annular plate 73 with perforations 74. The plate rests on shoulder 58 and thus forms the bottom of chamber 59. A shear pin 75 extends through wall means 54 into a hole 76 in the plate. The pin keeps the plate from turning, except when the pin shears during some emergency condition. The pin is made suitably small so that it may be sheared during such an emergency.

The powered shaft 51 rises from the motor in the base 50. The perforate plate 73 has a large cylindrical central opening 77 in which is located, with a minimum of clearance, a cylindrical rotor plate 78. The plate 78 is removably mounted, with a slip-fit, over stud 79 at the end of the shaft 51. The stud 79 is threaded into the end of shaft 51 and provides a threaded extension 80 for receipt of a nut or hood 81. The nut 81 secures the rotor plate 78 between it and a throw-out rotor 125 on shaft 51. The throw-out rotor 125 carries one or more pins 124 (see FIG. 5) for entering recesses in rotor plate 78. The pin(s) 124 maintain the plate 78 non-rotatable with respect to the throw-out rotor 125 when the nut 81 is not in its clamping position. Nut or cap 81 is cylindrical and has a truncated end terminating above the level of the rotor arms 84. The nut 81 serves as a distributing cap or hood for spreading material being fed thereto.

Figure 5:
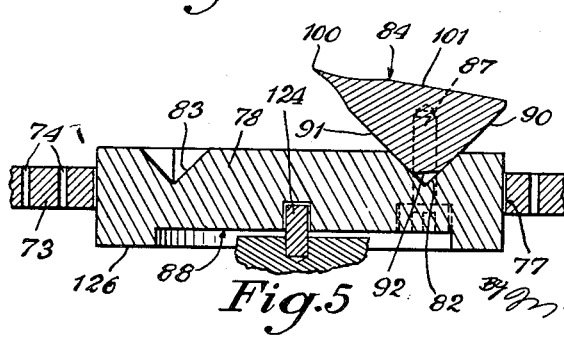
FIG. 5 is an enlarged cross-sectional view of the rotor shown in FIG. 3 taken on the line B—B of FIG. 3.
Figure 3:
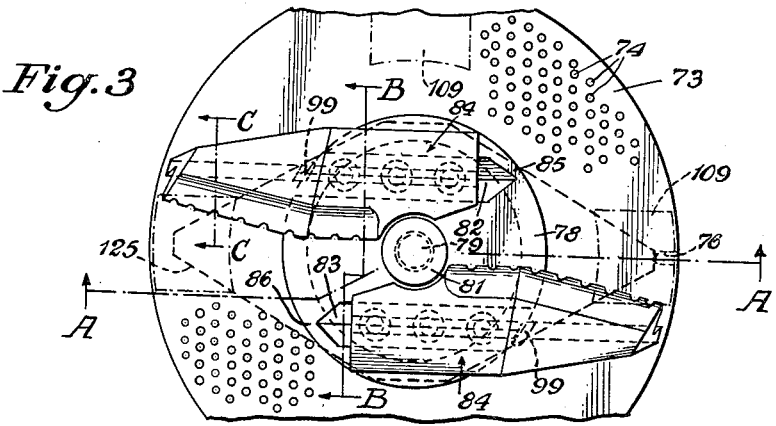
FIG. 3 is a top plan view of a rotor and of a perforate plate looking down upon such elements as shown in FIG. 4.

FIGS. 3 and 5 show that the rotor plate 78 has two parallel grooves 82 and 83. Rotor arms 84 are secured in these grooves. The inner ends of the grooves are closed as shown in FIGURE 3 at 85 and 86. The arms 84 have a cross-section (FIG. 5) that permits them to be positioned in grooves 82 and 83. Bolts 87 extend through holes in the underside 88 of the plate 78 and extend into and threadably engage the arms 84 so as to securely retain them in the grooves.

FIG. 3 shows two arms or knives 84 mounted in the two grooves and extending outwardly. The arms are substantially identical when new, and are so mounted that they are balanced for high speed rotation counterclockwise in FIG. 3. The arms rotate at right angles to the axis of rotation of the rotor.

The arms 84 serve as knives and as propellers. The arms 84 have a leading edge which may be considered or designed to shear or cut, a trailing cutting edge which shears or cuts, and a propelling face therebetween. The axial distance between these cutting edges diminishes toward the tip to provide substantial hydrodynamic balance. Said face has a propelling portion extending from said leading cutting edge inclined forwardly in the direction of rotation. A portion of the face also has a changing and increasing degree of inclination relative to the axis as said face approaches the trailing cutting edge. The changing and increasing degree of inclination of said face provides a pressure pocket immediately adjacent the trailing cutting edge that extends outwardly of said axis and forwardly in rotation of the trailing cutting edge. The body portion extends rearwardly in rotation of the propelling face. The body portion at any point along the leading edge extends a distance rearwardly in rotation that exceeds the axial distance between said edges at said point. The arm is thus wider than it is high. The trailing edge lies rearwardly in rotation of a plane passing through the axis of rotation and the tip of the trailing edge. The propelling face is shaped and positioned to provide an axially gathering surface for axially gathering material, which surface leads to said pressure pocket. The pocket extends rearwardly in rotation of a plane passing through the axis of rotation and the tip of the trailing edge and exerts a force tending to oppose movement of material outwardly toward the tip in a region adjacent the trailing edge.

The vertical or axial adjustment of the shaft 51 by the hand wheel 52 is indicated by the two-headed arrow 89 in FIG. 4. The adjustment for operation is such that the lowermost bounding plane containing the lower edges or trailing edges of the arms is adjustable to desired settings toward and away from the perforate plate 73. These lower edges rotate contiguous to the surface of the plate. If desired, the arms may be urged down into direct contact with the perforated plate so as to apply pressure thereto, which pressure is controlled by adjusting the hand wheel 52.

The knives or arms 84 narrow outwardly to provide substantial hydrodynamic balance so that the outer end of each knife or arm will not be working out of balance with the inner portions. Further, the arms are shaped to avoid turbulence which would cause overheating of the meat, to permit recirculation of material in the comminuting portion, and to have strength to permit their operation at high speeds, such as exemplified by about 3000 r.p.m. or about 3600 r.p.m.

Figure 7:
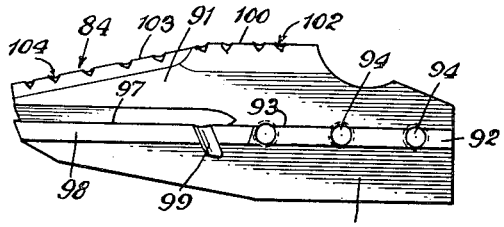
FIG. 7 is a view of the rotor arm shown in FIGS. 3 to 6 looking directly at the underside of the rotor as mounted in FIG. 4.

The mounted end of the arm 84 is shown in cross-section in FIG. 5. The surfaces 90 and 91 are at right angles to each other, therefore, the triangular grooves 82 and 83 in plate 78 are right-angle grooves. The normal junction of surfaces 90 and 91 directly above the plate 78 is cut away by a bottom or third surface 92, as shown in FIGURES 5 and 7. The arms 84 may be disposed so that they rotate contiguous to the plate 73. The bottom surface 92 is flat, which facilitates the drilling of holes 94 (FIG. 7) for mounting the arm to the plate 78. The surface 91 of the tapered portion of the arm that extends outwardly beyond the plate 78 is provided with a recess 95. The inclined flat surface terminates at its lower boundary in a straight line or cutting edge 97, which in a new cutter is a straight extension of the straight line 93 that extends over the plate 78. The lowermost or trailing cutting edge 97 is formed at the intersection of surfaces 96 and 98. These surfaces, 96 and 98, intersect at an acute angle and define a chisel.

Figure 6:
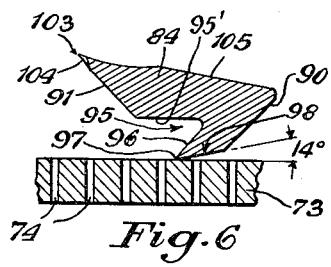
FIG. 6 is a cross-sectional view of the rotor arm and a part of a perforate plate shown in FIG. 3 taken on line C—C of FIG. 3.

When the illustrated bottom surface 92 of FIG. 7 forms equal angles with the surfaces 90 and 91, it will, if extended beyond the periphery of circular plate 78 to the free end, rotate parallel to the flat perforate plate 73. Experience has shown that when such a parallel surface 92 rotates in direct contact with the plate, the arm creates friction and heat. To avoid this heating effect under such operating conditions and to lessen the drag on the motor by the friction, the surface 92 at the mounted end of the arm is not extended as such beyond the periphery of the circular plate 78. Instead, the arm is slightly machined back from the knife edge 97 to form a relief surface 98 (FIGS. 6 and 7) which is inclined away from the plate 73 at an angle, such as 14°. The relief surface 98 back of the knife edge 97 overlies the perforate plate 73 and is extended slightly into the mounting groove on the plate 78. The arm is resharpened by the grinding of surface 98, which raises the level thereof with reference to surface 92 and forms a new knife edge 97 at the intersection of surfaces 96 and 98. When the arms are to be resharpened, the plate 78 with the arms mounted in it, is placed in a suitable grinder. To protect the rim of the plate 78 from contact with the grinding wheel, a notch 99 is formed in the cutter across knife edge 97, as shown in FIGS. 4 and 7, partly within and partly outside said rim.

The arm 84 also has its leading edge formed as a second and upper knife edge uppermost in the mounted position of the arm 84. The upper inner knife edge 100 is parallel to the lower knife edge 97. The surfaces that intersect to form this edge are hollow-ground, as shown with some exaggeration, and the edge is serrated as shown at 102 to provide a sawing or drawing action. The upper knife edge also has an outer portion 103 on the tapered free end of the arm that extends outwardly beyond the periphery of plate 78. The edge 103 converges outwardly toward the plane of the lower knife edge 97. The edge 103 likewise is hollow-ground and is serrated as shown at 104. Rearwardly in rotation of knife edge 103, is the surface 105 which extends outwardly from bar surface 101, slopes downwardly and outwardly toward the tip of the arm, and slopes rearwardly in rotation. On the other hand the surface 101, although sloping rearwardly, does not taper outwardly.

The propelling face that connects the leading and trailing edges includes the recess 95. The propelling surface 91 propels material toward the plate. The surface 91 leads to the upper roof or heel 95' of the recess 95. The rate of propulsion of material in the direction of rotation is rapidly diminished at the heel 95'. Because of the shape of the pressure heel or roof 95' of said recess 95 and its relationship to the perforate plate, the larger particles of material being comminuted are squeezed in the recess or pressure pocket 95 and to a certain extent into the perforations of the plate 73. Because the trailing cutting edge 97 lies rearwardly of an axial plane passing through its tip, the centrifugal force acting on meat in the pressure pocket 95 is opposed. As the trailing cutting edge is resharpened after use to a new knife edge 97, the height of the pressure pocket is reduced. In comminuting meat, this reduction of the thickness or height of the pressure pocket increases the efficiency or effectiveness of the cutting rotor. This improved cutting action is believed, in the case of meat, to result from the ability of the pressure pocket or heel to cause smaller and smaller pieces of meat material to be subjected to a squeezing-cutting action.

In the drawings, the recess 95 is formed to provide an abrupt change in the rate of propulsion toward the perforate plate as material reaches the overhanging roof or heel 95', which is the upper surface of the pressure pocket 95. The cutting edge 97 cooperates with the pressure pocket and cuts or shears at the edges of the holes of the plate meat particles that have been pressed into holes in the area between said heel and said plate.

Figure 8:
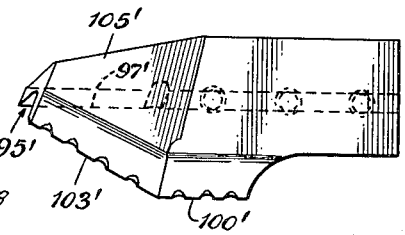
FIG. 8 is a modified form of a rotor arm that is used in apparatus of smaller diameter than shown in FIG. 4.

FIG. 8 shows a modified and shorter rotor arm or knife which is used with the previously mentioned knife holder or rotor plate 78, but in a machine having a perforate plate and comminuting portion with smaller diameters. As shown, the modified propelling and cutting arm is made of the same bar stock as the longer arm of FIG. 7. The cutting arm is shorter resulting in a shorter lower knife edge 97', a shorter upper knife portion 100', a shorter upper knife portion 103', a more sharply sloping tapered surface 105', and a smaller recess 95'.

The wall means 60 enlarges at a bottom portion thereof, as shown in FIG. 4, to form an upwardly converging frusto-conical wall 107 with a supporting flange 69 that fits over the packing ring or seal 62. This seal excludes the ingress of air thereat into the apparatus and thus avoids the danger of air being emulsified into the material being treated.

The frusto-conical wall 107 is spaced above the path of upper knife edge 103 of rotor arm 84 in order to provide a space over the cutter for material to move up and out of the path of the cutter and to be baffled back toward the center by the sloping wall 108.

Further, to minimize circulation and hence heating, shearing and obstructing lugs 109, as shown in FIGURES 2, 3, 4, and 12, project from the sloping wall 108 inwardly and downwardly over the path of the rotor arms 84. The lugs 109 abruptly stop spiral circulation and help cause the return of flowing material toward the center. Lugs 109 have lower side edges 110 positioned for shearing clearance with the cutter edges 103, so that large pieces of material in the path of the cutter are more quickly cut. Lugs 109 have flange portions 111 to shear or cut material at the tips of arms 84. The upper outer portions of flange portions 111 abut the inner peripheral ridge 112 of wall means 54. The annular space between wall means 54 and the path of rotation of the tips of the knives provides a channel in which material centrifugally directed to wall means 54 may move upwardly to the sloping wall 108 for return toward the center.

The lugs 109 have opposed parallel side faces 113 and 114 and a substantial width, corresponding to an arc of about 20° at the periphery of perforate plate 73. The angle formed by the knife edge 103 with side edge 110 and arcuate edge 115 of the lugs 109 are shown in FIGS. 3 and 4. The inner face 116 of the lugs 109 extends between the edge 115 and, as shown in FIGURE 4, the upper periphery of the frusto-conical surface 107 and serves as a baffle.

In FIGS. 10 and 11, only the modified portions of the lugs are newly designated. In FIG. 10 the tapered lug 118 has side faces 119 and 120 and provides the edge 121 at face 119 to cut or shear with the knife edge 103. In FIG. 11 the lug 123 retains the face 114 of lug 109, and a half of face 116 and a half of edge 115 of lug 109. Lug 123 has the face 119 and edge 121 of the lug 118 to effect a cutting or shearing and to baffle material toward the center.

FIGURES 23 and 24 show lugs 233 that extend from the sloping wall means 232 shown in FIG. 23.

The centrifugal ejector rotor 125 in the discharge portion is generally diamond-shaped as shown in dotted outline in FIG. 3, and in cross-section in FIG. 4. Rotor 125 supports the rotor plate or knife holder 78 at a peripheral lip 126 on the underside of the plate. Pins 124, as shown in FIG. 5, are secured in the rotor 125 and enter complementary holes in the plate 78. Rotor 125 is fixed to the shaft 51 by a key 127 in the shaft and in the key slot 128 in the rotor. The top surface 129 of rotor 125 is spaced away from the underside of perforate plate 73, whereby the shaft 51 with the rotor 125 and plate 78 may be raised from the position shown in FIGURE 4. The lower surface 130 of rotor 125 is shown spaced from the floor of chamber 55 so that the shaft 51 may be lowered, as the rotor arms are sharpened.

Comminuted material is discharged from the discharge portion with the assistance of the ejector rotor through the outlet 57 and spout 56.

The wall means 53 (FIG. 4) is separate from wall means 54, and contains axial adjusting mechanism. Shaft 51 runs free in an opening in collar 132 at the top of wall means 53. When the hereinafter-described seal at the bottom of chamber 55 is absent, it is desirable to protect the adjusting mechanism from possible contact with material from chamber 55, especially leaking brine from the curing salt. This is done by having the rotary canopy of flinger plate 133 resting on a shoulder 134 of the shaft 51. The plate 133 is keyed at 135 to shaft 51 at a collar portion 138. The collar 138 runs freely within a collar 139 of wall means 54. The ejection rotor 125 is supported by collar 138 on the flinger plate. Thus, the cap or nut 81 clamps between it and flinger plate 133, the knife holder or rotor plate 78 and the rotor 125.

By providing a feed chamber, comminuting chamber and discharge chamber, all sealed against ingress of air, my apparatus produces a continuous and moving hydraulic column of meat emulsion. As a result, the output of the machine is multiplied several times and excessive temperature rise in the emulsion is avoided.

Heretofore, it has been known to admit air into an ejection chamber such as 55 in the vicinity of the rotor shaft bearing a centrifugal pump rotor, whereby the suction effect draws in air and the air assists in the ejection of material from the machine. It has been found that such admission of air is disadvantageous. It mixes air bubbles into the discharged material which has not only an oxidizing effect on meat, but is also troublesome when the mass is used for sausage and like encased meats. Air bubbles lead to fat and jelly pockets in encased or other forms of comminuted meats. By eliminating air bubbles, more compact products are obtained, and less casing is required per unit weight of meat, such casings being an important item in cost. In addition, the admission of air into chamber 55 lessens the suction effect of the rotor 125 on material above the perforated plate, thus increasing the time for material to pass through the machine, and hence, increasing the time for circulation and consequent heating.

To avoid these disadvantages and to secure important advantages, the chamber 55 is sealed except for exposure to the underside of plates 78 and 73 and for exposure to the outlet 57 for spout 56.

FIG. 4 shows a suitable seal positioned to exclude entry of air at the shaft 51. Because the shaft is vertically adjustable, the seal is made expansible and compressible, when it functions between the floor 140 of the chamber 55 and the underside of rotor 125.

Figure 9:
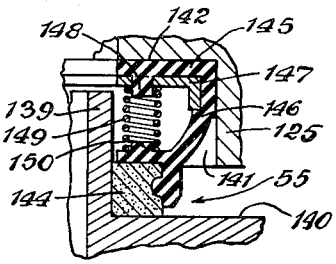
FIG. 9 is an enlarged fragmentary view in cross-section showing a seal shown in FIG. 4.

The upstanding annular collar 139 is spaced from the shaft 51 and extends into a right-angular recess 141 (see FIG. 9) in rotor 125. The recess 141 has a face 142 parallel with the floor 140 and perpendicular to the axis of the shaft 51. A ring seal is located between the face 142 and floor 140.

The ring seal (FIG. 9) comprises a graphite or plastic ring 144 which runs on floor 140, and a flexible resilient casing of rubber or like material of which an annular face portion 145 contacts the face 142. The casing extends downwardly and inwardly at portion 146. The end of portion 146 is forked in cross-section to cover and carry said ring 144. At the inside junction of casing portions 145 and 146 is an annular flanged metal ring 147 having holes through and beyond which project small integral extensions 148 of the casing portion 145. The upper extensions 148 and lower extensions 150 of the casing enter and serve as a mounting for the upper and lower ends of compression springs 149. The springs 149 render the seal resilient, and the flexible resilient casing portion 146 keeps the recess sealed.

The ring seal is a removable unit and is easily replaced. Its effectiveness is evidenced by the fact that operations without it greatly reduce the load on the motor.

The remainder of the machine as shown in FIG. 4 includes means to adjust the shaft 51 vertically to position the rotor arms. In the machine as shown, such means is placed near the rotor arms. Because the portion of the shaft within the motor is heated and cooled, as the motor runs and idles, such portion changes in length. In order that this change is not so transmitted as to change the adjustment during an operation, the adjusting means is above the motor.

Wall means 53 (FIG. 4) has an inner collar portion 152 with an internally threaded opening concentric with shaft 51. A circular threaded box 153 is mounted in said opening. The top of box 153 is secured by screws 154 to a ring 155 having teeth 156 meshing with a worm gear 157 on shaft 158. The shaft 158 carries the handwheel 52 that is shown in FIGS. 1 and 2. A hand-screw 159 is tightened to lock shaft 158 in an adjusted position.

The vertical movement of box 153 moves the shaft 51. Within box 153 is a double ball-bearing structure with inner race portions rigid with shaft 51 and outer race portions rigid with box 153. Shaft 51 has a shoulder 160 on which rests a collar 161. The collar 161, together with locking nuts 162 on a threaded portion 163 of shaft 51, clamps inner races 164 and 165 so that said races move with the shaft. The outer and stationary races 166 and 167 are secured in box 153 in part by the ring gear 155, as shown. An oil seal is indicated at 168.

In the operation of the machine shown in FIG. 1, meat products to be comminuted are fed into the funnel 71. The machine must not be operated without material to be comminuted. Operation quickly lowers the level of material above the plate 73, and the level is preferably maintained as high as possible in the funnel 71. The fleshy character of the meat material provides a hydraulic head. The packing 62 between wall means 54 and wall means 60 and the packing 72 between wall means 60 and funnel 71 prevent the entry of air above the plate 78. The ring seal for the shaft shown in FIGS. 4 and 9 prevents the entry of air below the perforate plate 78. The hydraulic head seals one end of the machine and the material in outlet 57 seals the other end.

In operating a machine as described at 3600 r.p.m., in which the annular perforated plate has diameters of 9¾ and 4¾ inches, with foramens having a diameter of .055 inch, a mixture of meat products for producing frankfurters, for example, is processed at the rate of 275 lbs. per minute.

FIGS. 12 to 18 relate to different forms of cutting and propelling rotors in which the height of the pressure pocket of the arm may be maintained substantially constant or adjusted by replacing an insert in the form of a chisel and which provides the trailing cutting edge. The insert may be resharpened, if desired, thereby lowering the pressure heel. The insert comprises only a small piece of tool steel, so that economically it may be replaced at about the same cost as labor to resharpen it.

Figure 12:
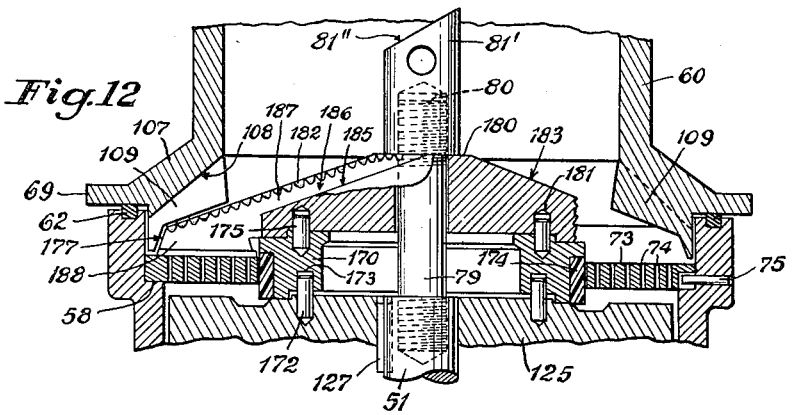
FIG. 12 is a fragmentary view, similar to that of FIG. 4, showing a rotor that differs from those shown in the previous figures.

FIG. 12 shows a broken section of apparatus similar to the showing in FIG. 4, to illustrate the mounting of a one-piece rotor.

The ring or rotor plate 170 rests concentrically on the ejection rotor 125 and is connected to it by means of pins 172 fixed in the ejection rotor 125 for entry in holes 173 of the rotor. The lower portion of the rim of the rotor plate 170 is provided with a replaceable, tough, protective plastic ring 174. The ring 174 has slight clearance with the perforate plate. The ring 170 has fixed pins 175 extending from its upper face to engage the cutting and propelling portions of the rotor, of which several forms are shown and hereinafter described. The pins 175 enter holes 181 of the rotor.

Figure 13:
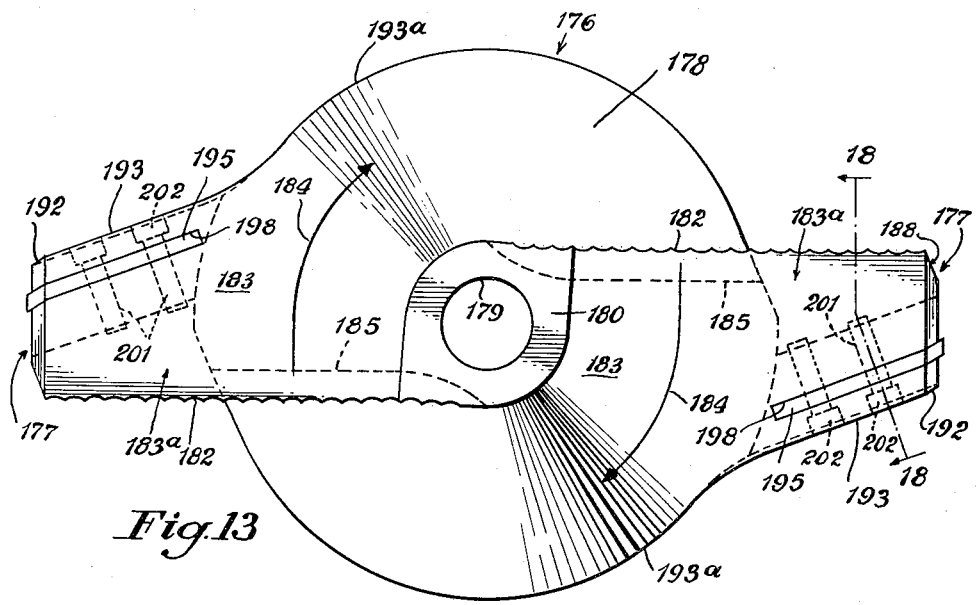
FIG. 13 is an enlarged plan view of the rotor shown in FIG. 12.
Figure 14:
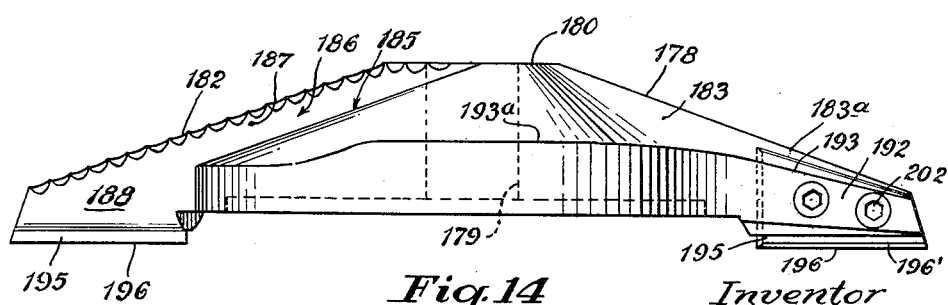
FIG. 14 is an elevational view of the rotor shown in FIG. 13.
Figure 15:
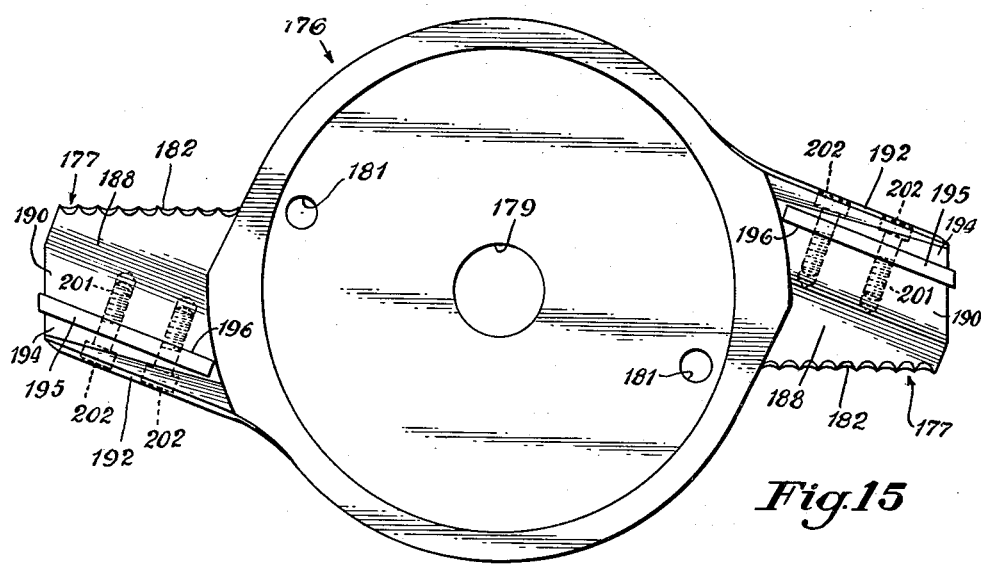
FIG. 15 is a view of the underside of the rotor shown in FIG. 13.
Figures 16, 17:
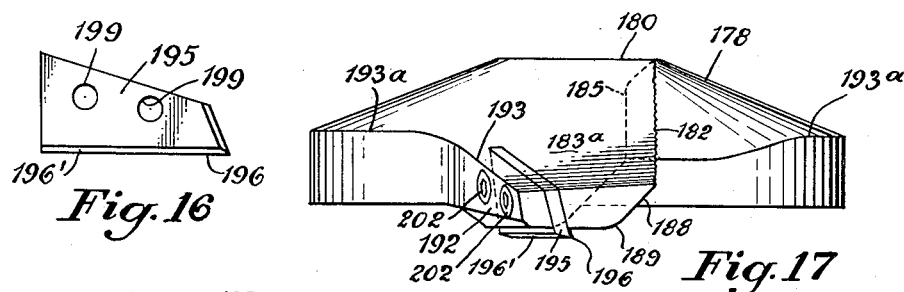
FIG. 16 is a view of the removable blade of the rotor shown in FIG. 13 that provides the trailing cutting edge.
FIG. 17 is a right side elevational view of the rotor shown in FIG. 13.

The rotor 176 shown in plan view in FIG. 13 has two cutting arms 177 projecting from a generally circular body portion 178. The portion 178 has a central hole 179 that is defined by the central flat surface 180. The hole 179 receives the stud 79 from shaft 51, so that the threaded extension 80 of said stud receives the cap or hood 81'. The hood 81' holds the cutting and propelling portions of the rotor onto the rotor plate 170. The hood 81' has a truncated end 81" which serves as a spreading surface for material fed thereto.

From the periphery of the flat central top 180, there are two, serrated, tangential, leading cutting edges 182 which, when the rotor 176 is rotatably mounted in the apparatus, extend as essentially straight lines outwardly of the axis of rotation and downwardly toward the perforate plate 73. Each of the rotor arms has a surface within the periphery of the hub that slopes smoothly downwardly away from the cutting edge 182 to a line 185 that is parallel with the edge 182. This forms a throat 186 under each leading cutting edge, which throat has an upper surface 187, which together with the surfaces 183 of the arms forms that part of the cutting edge 182 which lies centrally of the circular body portion 178.

Each of the arms 177 of rotor 176 has a leading cutting edge 182 and trailing cutting edge 196, and a propelling face therebetween. The axial distance between these edges diminishes toward the tip of the arm to provide substantial hydrodynamic balance. The face has a portion that extends from the leading edge and is inclined forwardly in the direction of rotation. The face has a changing and increasing degree of inclination relative to the axis of rotation as the face approaches the trailing edge. This changing and increasing degree of inclination provides a pressure heel and a pressure pocket 191 that is immediately adjacent the trailing edge 196. This pocket extends forwardly in rotation of the trailing edge.

Figures 18, 20:
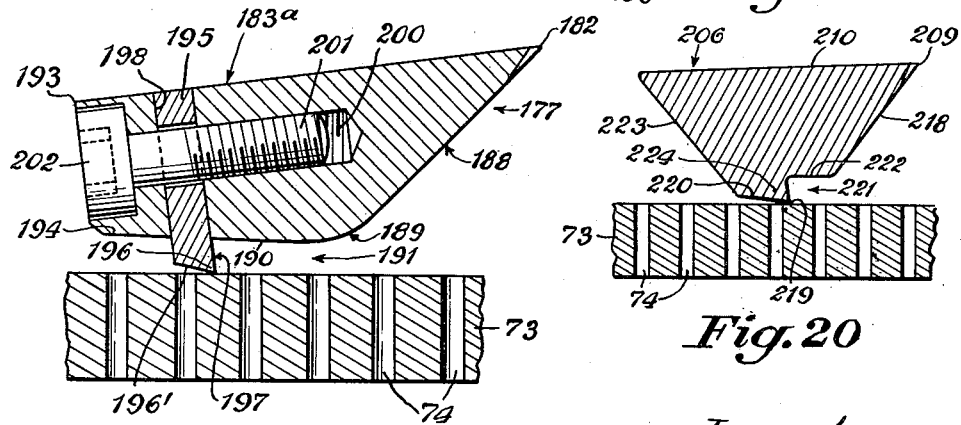
FIG. 18 is an enlarged cross-sectional view of the rotor arm shown in FIG. 13 taken on the line 18—18 of FIG. 13, and shows its relationship to the perforate plate.
FIG. 20 is an enlarged cross-sectional view, similar to FIG. 18, of the rotor shown in FIG. 19 taken on the line 20—20 of FIG. 19.

As shown in FIGURE 18, the portion 188 of the propelling face is a propelling surface that leads to surfaces 189 and 190. This structure provides the face with a portion having a changing and increasing degree of inclination and includes pressure heel 190. The pressure heel 190 is similar to heel 95' of the arm 84 in that it is substantially parallel to the cutting plane of the trailing edge. The surface 197 extends from the pressure heel 190 to the trailing edge 196. The edge 196 of the blade 195 is in the form of a chisel.

The arm 177 has a top surface 183a that is an outer extension of the top central surface 183 of the body portion. The surface 183a, beyond the hub, slopes rearwardly in rotation away from the leading cutting edge 182, as shown in FIG. 18. The surface 187 of the throat 186 lies in the same plane as inclined propelling surface 188. The propelling surface 188 becomes less inclined at its lower region 189 and is preferably extended as a substantially horizontal surface or heel 190. Numeral 191 designates the pressure pocket. The pocket is immediately adjacent the lower edge 196 and extends forwardly in rotation of said edge.

The trailing portion of the arm 177 has a rear face 192 (FIG. 17) that joins the top face 183a at the edge 193. The edge 193 is an extension of the circular edge 193a of the central body portion 178. The surface 190 of the arm is extended back, rearwardly of exposed portion of blade 195, and joins the face 192 at 194. This provides the trailing cutting edge 196 with its back relief 196' of about 14° with the plane of the lower edge. The exposed surface 197 of the blade 195 is part of the propelling face connecting the leading and trailing cutting edges.

The cutting blade 195 is an insert (FIG. 16) that fits in a slot 198 cut into the arm from its outer end. Two holes 199 extend through the blade and register with the threaded holes 200 of the arm. The trailing surface 192 receives mounting screws 201 and is recessed to receive the heads 202 of screws 201. The screws 201 secure the blade 195 to the arm.

As shown in FIG. 12, the ends of the arms 177 conform to the contour of the lugs 109, so as to shear or cut therewith as described for the arms of cutters 84.

A modified form of the one-piece rotor above described is shown in FIGS. 19 to 22, in which the body portion and both arms are integral. The rotor has a circular central body portion 205 with projecting arms 206 extending outwardly thereof. A slightly recessed flat area 208 for the nut 81' extends about the axial bore 207. The arms have upper leading cutting edges 209 that are straight lines that are parallel to an axial plane through the tip of the trailing cutting edges. The top of the cutter outside of the flat area 208 comprises two smooth portions 210, each of which extends smoothly rearwardly in rotation away from the upper cutting edges 209 and slopes smoothly outwardly toward the tip of the arm. Part of each of the inner portions 210 of the arms defines a half of the top of circular body portion 205 and a top inner part of the arms 206. Each surface 210 terminates, within the periphery of the body 205, inwardly under knife edge 209 at a line 212 which is at the bottom of a throat 213. The surface 214 forms knife edge 209 in conjunction with the top surface 210. The underside 216 of the body portion of the rotor fits on rotor plate 170 (shown in FIG. 12) and has holes 217 to receive pins 175.

The surface 214 of throat 213 lies in the same plane which forms a propelling surface 218 of the arm 206. The surface 224 intersects surface 220 to form the lower chisel edge 219. The trailing cutting edge portion 219, with relief 220 (FIG. 20) lies rearwardly of said surface 218. The pressure heel 222 and surface 224 form a pocket 221. The rear surface 223 of the arm 206 intersects the surface 220.

The cutting edge 219 of FIGS. 19 to 22 may be resharpened thereby shortening the height of the pressure heel 222.

FIG. 23 is a fragmentary view of a comminuting chamber, similar to that shown in FIG. 12, showing a portion of a rotor arm in operating position therein. The wall 226 has a ledge 227 for perforate plate 228, and a rim 229 with packing 230. The packing seals the interface of 226 and 231. The neckpiece 231 has sloping surface 232 and downwardly extending lugs 233. The cutter arm 234 is positioned close to the perforate plate. The surfaces 235 and 236 of the arm are shown in FIGURES 23 and 25.

The entire cutter is shown in FIG. 24, which is taken on line 24—24 of FIG. 23 and is extended in full. The rotor has the same general form as described for FIGS. 19 to 22, but with modification of the arm 234.

The arm 234 has a leading cutting edge 237, a propelling surface 238 leading to pressure pocket 239 forward of trailing cutting edge 241. The pocket 239 is narrower at its entrance than it is rearwardly within it. This narrow entrance has the space between arrows 243, shown in FIG. 25, in which particles are squeezed.

FIG. 26 shows in cross-section a still different form of rotor arm in which the trailing cutting edge is a replaceable and adjustable blade. The arm has a leading cutting edge 245 forward of a rearwardly sloping surface 246. The propelling surface 247 of the propelling face extends downwardly and rearwardly from the cutting edge 245. The lower portion of surface 247 curves forming a pressure heel 248 and rear surface 249.

Threaded openings 250 for receiving screws 251 extend into the arm at the rear surface 249. The screws secure the blade 252 to the surface 249. The blade 252 is in the form of a chisel and has holes 253 that are larger than screw 251, and has a relieved trailing cutting edge 254. By adjusting the position of the blade 252 on the surface 249, the height of the pressure pocket may be adjusted relative to the perforate plate 255.

Figure 27:
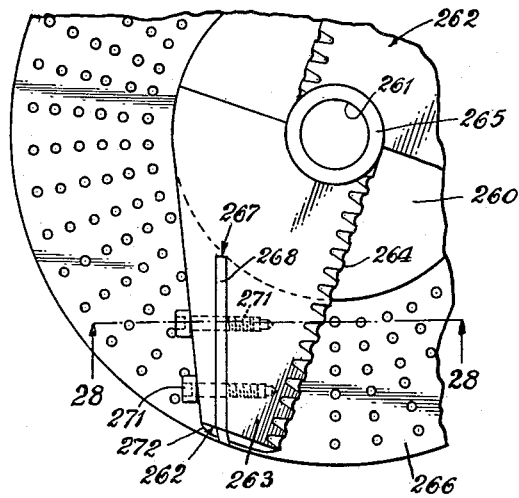
FIG. 27 is a fragmentary plan view of another modification of the rotor showing an adjustable blade.
Figure 28:
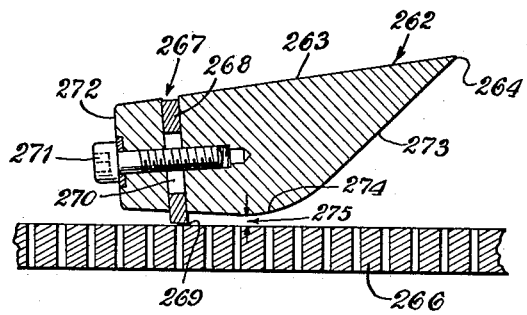
FIG. 28 is an enlarged cross-sectional view similar to FIGS. 18, 20, 25 and 26 taken on the line 28—28 of FIG. 27, and shows a portion of the perforate plate.

FIGS. 27 and 28 represent a different rotor in which the trailing cutting edge of the arm is an adjustable insert housed in a slot formed inwardly from the end of the cutter arm. FIG. 27 shows the rotor as being similar to those above described and as having a circular body portion 260 adapted to be mounted on a shaft extending through the bore 261. It has projecting arms 262, each of which has a top surface 263 extending over the top of the body portion. The top surface 263 forms one surface of the leading cutting edge 264. The surface 263 extends tangentially from the flat annular area 265 outwardly and downwardly toward the perforate plate 266 over which the cutter is mounted.

A slot 267 is formed into the arm for the blade 268, the bottom of which has a forwardly directed cutting edge 269 that is rearwardly relieved. The arm rotates contiguous to the plate 266. Blade 268 has holes 270 that are larger than the screws 271. The screws 271 extend from the rear surface 272 and secure the blade in the slot. A propelling surface 273 of the propelling face extends from the leading cutting edge 264.

The surface 273 leads to provide pressure heel 274 and pressure pocket 275. The height of the pocket may be adjusted by adjusting the position of the blade 268.

The axially rotatable, balanced, high speed, propelling cutting rotors described above have at least one propelling arm extending outwardly away from its axis of rotation to a tip. The arm has a leading cutting edge, a trailing cutting edge in the form of a chisel, and a propelling face therebetween. The trailing edge lies rearwardly in rotation of a plane passing through the axis of rotation and the tip of the trailing edge. The axial distance between these cutting edges diminishes toward the tip to provide substantial hydrodynamic balance.

The arm has a body portion extending rearwardly in rotation of the propelling face. The body portion has a surface that slopes gradually rearwardly and downwardly away from the leading cutting edge and slopes gradually downwardly and outwardly toward the tip. The arm is wider in a rearward direction than its height as defined by the axial distance between the leading and trailing edges.

Said face has a portion extending downwardly from the leading edge toward the cutting path of the trailing edge and is thus inclined forwardly in the direction of rotation. The face has a changing and increasing degree of inclination relative to the axis as said face approaches the trailing cutting edge. The changing and increasing degree of inclination of said face provides a surface extending outwardly of said axis substantially parallel to a plane generated by rotation of the trailing edge. The substantially parallel surface leads to a different surface of the face. Said different surface extends downwardly and forwardly toward the trailing edge. The substantially parallel surface and downwardly and forwardly extending surface intersect at an acute angle and provide a pressure pocket immediately adjacent the trailing edge. The pressure pocket extends outwardly of said axis and extends forwardly in rotation of the trailing edge.

The propelling face is shaped and positioned to provide an axially gathering surface for axially gathering material, which surface leads to said pressure pocket.

The pocket extends rearwardly in rotation of a plane passing through the axis of rotation and the tip of the trailing edge and exerts a force tending to oppose movement of material outwardly toward the tip in a region adjacent the trailing edge.

The particular apparatus heretofore described comminutes food material such as meat (e.g., sausages) to produce a comestible emulsion. The apparatus comprises wall means defining in advancing and communicating sequence a reservoir portion with feeding inlet means, a comminuting portion, and a discharge portion with outlet means.

Centrifugal ejector means is operatively associated with the discharge portion and is driven by drive means, including a shaft, that drives the rotor.

The wall means is constructed and arranged to provide during operation of the apparatus a continuous and moving hydraulic column of material substantially free of ingress of air. This column extends from at least the entrance of the comminuting portion to the outlet means in the discharge portion. The wall means of the reservoir portion extends toward the feeding inlet to provide a reservoir portion with a volume that is markedly greater than that of the comminuting portion.

The perforate plate is made of rigid metal and separates the comminuting portion from the discharge portion and has a large central opening and a multiplicity of relatively fine or small tubular passageways distributed throughout the annulus. The total area of the passageways is markedly less than the area of the plate and markedly less than the column immediately behind the plate so that the plate creates back pressure in the comminuting portion that directs material rearwardly of the plate. The outer circumference of the plate is not more than about twice its inner circumference.

High speed rotor means is rotatably positioned in the comminuting portion. At least a portion of the hub means of the rotor means rotates within the central opening of the annular plate in contiguous relationship thereto. The rotor has rotatable drive means, including a shaft, operatively associated therewith. The rotor means or a part thereof, is adjustable to selected positions relative to the perforate plate. The shaft of the drive means is sealed against ingress of air. The rotor means includes substantially centrally positioned rotatable hub means having a cap or hood means. The hood means provides a surface upon which the column spreads. The diameter of the spreading surface is less than the inner diameter of the annulus of the plate.

Still further, the rotor means has outwardly extending rotatable cutting or knife means that define in rotation cutting zones. One of these zones is contiguous to the perforate plate, whereas another of said cutting zones is positioned more remote from the plate.

Still further, the rotor means includes at least one outwardly extending rotatable propeller that coacts with the plate and directs material toward it. The propeller is tapered outwardly to provide substantially balanced feed at the inner and outer annulus of the plate. The propelling area is correlated with the diameter of the plate at corresponding positions on the propeller, so that the area of the propeller times the number of small openings in the perforate plate in the circumference is substantially constant.

The comminuting portion is shaped so that the hydraulic column has a diameter at a point immediately rearwardly of the spreading surface that is less than the outside diameter of the perforate plate.

The rotor means directs the material centrally outwardly as well as forwardly toward the perforate plate and causes the column to have annular form thereat. The wall means of the comminuting portion includes a recirculating surface and includes lugs projecting therefrom rearward over and in coacting relationship to the rotor means. The lugs tend to relieve at least some of the back pressure created by the perforate plate. The recirculating surface and lugs act to restrict substantially circulating material to the comminuting portion and to direct circulating material to the cutting means or knife means so that material that is directed centrifugally outwardly by the rotor means and rearwardly by the back pressure created by the perforate plate is circulated inwardly to the hydraulic column of material rearward of at least the cutting zone nearest the plate, thereby providing an air-sealing head of material.

The material that is thrown to the outside of the perforate plate by the propelling means is directed toward the inlet of the apparatus and toward the axis of rotation of the rotor, whereby the material on the inlet side of the perforate plate comprises a central column of new material that moves forwardly toward the hood means, an annulus of new material mixed with the enfolded circulated material on the periphery of said inner column, and an outer annulus of recirculated material that moves rearwardly and inwardly toward the central column. The area of the central column of new material is greater than the area of the annulus of the plate.

Apart from the subject matter described and summarized above, it has been found, from past experience, that satisfactory meat emulsions for sausages may be made when perforate plates are used having (a) an outside diameter of 150 mm., an inside diameter of 80 mm., and a thickness of 10 mm., (b) an outside diameter of 200 mm., an inside diameter of 120 mm., and a thickness of 10 mm., and (c) an outside diameter of 248 mm., an inside diameter of 120 mm., and a thickness of 10 mm.

In plate a, holes having a diameter of 1.4 mm., 1.7 mm., and 2.5 mm. have been found to be particularly satisfactory. When 1.4 mm. holes were used, approximately 1,735 holes appeared in the plate. When the holes in this plate were 1.7 mm. in diameter, approximately 1,173 holes appeared in the plate. When the diameter of the holes in this plate were 2.5 mm., approximately 709 holes were present in the plate.

In plate b, holes having a diameter of 1.2 mm., 1.4 mm., and 2 mm. have been found to be particularly satisfactory. When 1.2 mm. holes were used, approximately 3,853 holes appeared in the plate. When the holes in this plate were 1.4 mm. in diameter, approximately 2,892 holes appeared in the plate. When the diameter of the holes in this plate were about 2 mm., approximately 1,471 holes were present in the plate.

In plate c, holes having a diameter of 1.2 mm., 1.4 mm., and 2 mm. have been found to be particularly satisfactory. When 1.2 mm. holes were used, approximately 7,962 holes appeared in the plate. When the holes in this plate were 1.4 mm. in diameter, approximately 6,152 holes appeared in the plate. When the diameter of the holes in this plate were about 2 mm., approximately 2,914 holes were present in the plate.

Although coarse meat emulsions have been prepared using a perforate plate having holes with a diameter of about 14–16 mm., such plates were used in a comminuter that was operated in conjunction with additional apparatus having a perforate plate with relatively smaller openings therein. The coarseness of the emulsion increases with the size of holes in the plate.

The foregoing detailed description has been given for clearness of understanding only, and no unnecessary limitations should be understood therefrom, as modifications will be obvious to those skilled in the art.

I claim:

1. An apparatus for comminuting food material to produce a comestible emulsion comprising wall means defining in advancing and communicating sequence a reservoir portion with feeding inlet means, a comminuting portion, and a discharge portion with outlet means, said wall means being constructed and arranged to provide during operation of the apparatus a continuous and moving hydraulic column of material substantially free from ingress of air and extending from at least the entrance of the comminuting portion to said outlet means, a perforate plate separating said comminuting and discharge portions and having a multiplicity of small tubular passageways therein, the total area of said passageways being markedly less than the area of said plate and markedly less than the area of the column immediately behind the plate so that the plate creates back pressure in the comminuting portion, high speed knife means rotatably positioned in the comminuting portion, said knife means including a rotating propelling face that coacts with the plate and directs material toward said plate, said knife means defining in rotation at least two cutting zones, one of said zones being contiguous to said plate whereas another of said zones is positioned more remote from the plate, said wall means having a restricted portion rearward of said plate and in coacting relation with said knife means and plate, said wall means including recirculating means for directing inwardly substantially to the cutting zones material that is directed centrifugally outwardly by the knife means and rearwardly by the back pressure created by said perforate plate thereby providing an air-sealing head of material, and ejection means associated with said discharge portion.

2. The apparatus of claim 1 wherein wall means of the reservoir portion extends toward the feeding inlet means to provide said reservoir portion with a volume that is markedly greater than that of the comminuting portion.

3. An apparatus for comminuting food material to produce a comestible emulsion comprising wall means defining in advancing and communicating sequence a reservoir portion with feeding inlet means, a comminuting portion, and a discharge portion with outlet means, said wall means being constructed and arranged to provide during operation of the apparatus a continuous and moving hydraulic column of material substantially free from ingress of air and extending from at least the entrance of the comminuting portion to said outlet means, a perforate plate separating said comminuting and discharge portions and having a multiplicity of small tubular passageways therein, the total area of said passageways being markedly less than the area of said plate and markedly less than the area of the column immediately behind the plate so that the plate produces back pressure that directs material rearwardly, driven high speed rotor means being rotatably positioned in the comminuting portion and having drive means operatively associated therewith, said rotor means including substantially centrally positioned hub means, said hub means providing a surface upon which the column spreads, said rotor means having outwardly extending rotatable cutting means that defines in rotation at least one cutting zone, said rotor means having outwardly extending rotatable propelling means, said rotor means including means for directing material centrifugally outwardly as well as forwardly toward the perforate plate and causing the column to have annular form thereat, said wall means of the comminuting portion including a recirculating surface, said wall means including lugs projecting therefrom rearward of and in coacting relation to said rotor means, said lugs tending to relieve at least some of the back pressure created by said perforate plate, said recirculating surface and lugs including means for substantially restricting circulating material to the comminuting portion and to direct circulating material to the cutting means so that material that is direced centrifugally outwardly by the rotor means and rearwardly by the back pressure created by said perforate plate is circulated inwardly to the hydraulic column of material rearward of at least the cutting zone nearest the plate, thereby providing an air-sealing head of material, and ejection means associated with said discharge portion.

4. The apparatus of claim 3 wherein wall means of the reservoir portion extends toward the feeding inlet means to provide said reservoir portion with a volume that is markedly greater than that of the comminuting portion.

5. The apparatus of claim 3 wherein the perforated plate is annular in shape, at least a portion of the hub means rotates within the central opening of the annular plate in contiguous relationship thereto, and said drive means is connected to said rotor means.

6. An apparatus for comminuting food material to produce a comestible emulsion comprising wall means defining in advancing and communicating sequence a reservoir portion with feeding inlet means, a comminuting portion, and a discharge portion with outlet means, said wall means being constructed and arranged to provide during operation of the apparatus a continuous and moving hydraulic column of material substantially free from ingress of air and extending from at least the entrance of the comminuting portion to said outlet means, a perforate annular plate separating said comminuting and discharge portions and having a large central opening and a multiplicity of small tubular passageways about said opening, the total area of said passageways being markedly less than the area of said plate and markedly less than the area of the column immediately behind the plate so that the plate produces a back pressure that directs material rearwardly, driven high speed rotor means rotatably positioned in the comminuting portion, said rotor means including substantially centrally positioned hub means, said hub means providing a surface upon which the column spreads creating a zone of low pressure, said rotor means having outwardly extending rotatable cutting means and outwardly extending rotatable propelling means, said rotor means having rotatable drive shaft means connected therewith, said rotor means including means for directing material centrifugally outwardly as well as forwardly toward the perforate plate and causing the column to have an annular form threat, said wall means of the comminuting portion including a recirculating surface, said recirculating surface including means for directing to the comminuting portion material that is directed centrifugally outwardly by the rotor means and rearwardly by the back pressure created by said perforate plate so that said material is recirculated inwardly to the hydraulic column thereby providing an air-sealing head of material, and ejection means associated with said discharge portion.

7. The apparatus of claim 6 wherein the hub means is adjustable to selected positions relative to the plate, and the cutting means and propelling means are operatively associated with said hub means.

8. The apparatus of claim 6 wherein wall means of the reservoir portion extends toward the feeding inlet means to provide said reservoir portion with a volume that is markedly greater than that of the comminuting portion, and the diameter of the hub means at the central opening of the perforate plate is about one half the distance across the plate as measured through its center.

9. The apparatus of claim 6 wherein said recirculatory surface includes lugs.

10. A comminuting system for comminuting food material to produce a comestible emulsion comprising: wall means defining in advancing and communicating sequence a comminuting portion with inlet means and a discharge portion with outlet means; an annular perforate plate separating said comminuting portion and discharge portion, said plate providing outlet means from said comminuting portion to the discharge portion, said plate having a large central opening and a multiplicity of small perforations distributed throughout the annulus, the outer diameter of the annulus being about twice the diameter of the central opening; ejector means positioned in said discharge portion; centrifugal spreading hood means positioned in the comminuting portion and having a surface for centrifugally spreading material fed thereupon; centrifugal cutting means and centrifugal propelling means positioned in the comminuting portion and coacting with the plate, said propelling means being tapered outwardly to provide substantially balanced feed at the inner and outer areas of the annulus of the plate; said centrifugal spreading hood means, centrifugal propelling means, centrifugal cutting means, and ejector means providing a continuous and moving hydraulic column for comminution which contacts said spreading surface of the hood and extends to said plate; and means for directing material centrifugally thrown to the outer portion of the annulus of the plate rearwardly and centrally into the advancing hydraulic column.

11. The system of claim 10 wherein the comminuting portion is shaped to restrict the column before it contacts the centrifugally spreading surface, and the periphery of the spreading surface is within the confines defined by the projected diameter of the inner edge of the annulus of the plate.

12. The system of claim 10 wherein the comminuting portion has a diameter at a point immediately rearwardly of the centrifugally spreading surface that is less than the outside diameter of the plate.

13. A system for comminuting food material to produce a comestible emulsion comprising: wall means defining in advancing and communicating sequence a comminuting portion with inlet means and a discharge portion with outlet means, said wall means providing a conduit for a substantially air free hydraulic column; a rigid metal annular valve plate separating said comminuting portion and discharge portion; said plate having a multiplicity of small perforations distributed throughout the annulus and an outer circumference not substantially more than twice its inner circumference; centrifugal rotor means positioned rearwardly of the inlet side of the plate; said rotor means including at least one knife member, at least one propeller member extending over the plate and immediately adjacent thereto, and a distributing cap with a smaller diameter than the inner diameter of the plate; said cap providing a surface upon which the column spreads; means for supplying a hydraulic column of material for comminution to the distributing cap of the rotor means and to the plate; means for removing a column of comminuted hydraulic material from the system; means, including a shaft, for driving the rotor; means for sealing said shaft against ingress of air to the column of material during operation of the system; means for directing material thrown to the outside of said plate by said propeller toward the inlet means and toward the axis of rotation of said rotor, whereby the material on the inlet side of the plate comprises a central column of new material moving forwardly toward the cap, an annulus of new material mixed with infolded circulated material on the periphery of said inner column, and an outer annulus of recirculated material moving rearwardly and then inwardly toward the central column.

14. In an apparatus for producing comminuted food products from a flowable mass of mixed solid and liquid capable of forming a continuous air-free hydraulic column, which comprises: a housing having an inlet and outlet and providing a conduit for the hydraulic column and having a narrow central portion closed by a rigid metal annular valve plate; said plate having an outer circumference not substantially more than twice its inner circumference; central rotor member extending rearwardly of the inlet side of the plate toward the inlet portion of the housing; said rotor including at least one knife member, at least one propeller member extending over the plate and immediately adjacent thereto, and a distributing cap with a smaller diameter than the inner diameter of the plate; said cap providing a surface upon which the column spreads; said plate having a multiplicity of small openings extending transversely therethrough and distributed throughout its annular area; means for supplying a hydraulic column of material for comminution under a pressure head to the distributing cap of the rotor; means for removing a column of comminuted hydraulic material from the housing; means, including a shaft, for driving the rotor; means sealing said shaft against ingress of air to the column of material; means for directing material thrown to the outside of said plate by said propeller toward the inlet of the housing and toward the axis of rotation of said rotor, whereby the material on the inlet side of the plate comprises a central column of new material moving forwardly toward the cap, annulus of new material mixed with infolded circulated material on the periphery of said inner column, and an outer annulus of recirculated material moving rearwardly and then inwardly toward the central column.

15. The apparatus as set forth in claim 14 wherein the propeller area is correlated with the diameter of the plate at corresponding positions on the propeller, so that the area of the propeller times the number of openings in the plate in the circumference is substantially constant.

16. The apparatus set forth in claim 14 wherein said narrow central portion has a cross-sectional area greater than the area of the annulus of the plate.

17. An apparatus for comminuting food material to produce a comestible emulsion comprising wall means defining in advancing and communicating sequence a reservoir portion with feeding inlet means, a comminuting portion, and a discharge portion with outlet means, said wall means being constructed and arranged to provide during operation of the apparatus a continuous and moving hydraulic column of material substantially free from the ingress of air extending from at least the entrance of the comminuting portion to said outlet means, a perforate plate separating said comminuting and discharge portions and having a multiplicity of fine openings therein, the total area of said openings being markedly less than the area of said plate and markedly less than the area of the column immediately behind the plate so that the plate creates back pressure in the comminuting portion, high speed knife means rotatably positioned in the comminuting portion, said knife means including a rotating propelling face that coacts with the plate and directs material toward said plate, said knife means defining in rotation at least one cutting zone, said wall means of the reservoir and comminuting portions including recirculating means rearwardly of the knife for directing inwardly substantially to the cutting zone material that is directed centrifugally outwardly by the knife means and rearwardly by the back pressure created by said perforate plate thereby providing an air-sealing head of material, and ejection means associated with said discharge portion.

18. An apparatus for comminuting food material to produce a comestible emulsion comprising wall means defining in advancing and communicating sequence a reservoir portion with feeding inlet opening means, a comminuting portion, and a discharge portion with outlet means, said wall means being constructed and arranged to provide during operation of the apparatus a continuous and moving hydraulic column of material extending from at least the entrance of the comminuting portion to said outlet means, a perforate plate separating said comminuting and discharge portions and having a multiplicity of fine openings therein, the total area of said openings being markedly less than the area of said plate and markedly less than the area of the column immediately behind the plate so that the plate creates back pressure in the comminuting portion, high speed knife means rotatably positioned in the comminuting portion, said knife means including a rotating propelling face that coacts with the plate and directs material toward said plate, said knife means defining in rotation at least one cutting zone, centrifugal ejector means associated with said discharge portion and recirculating means rearwardly of the knife for directing material from the plate to the air-sealing hydraulic column of material rearward of the knife means.

References Cited in the file of this patent

UNITED STATES PATENTS

| | | |
|---|---|---|
| 2,842,177 | Schnell | July 8, 1958 |
| 2,906,310 | Schnell | Sept. 29, 1959 |
| 2,934,121 | Schnell | Apr. 26, 1960 |
| 2,952,288 | Schnell | Sept. 13, 1960 |

FOREIGN PATENTS

| | | |
|---|---|---|
| 179,437 | Austria | Aug. 25, 1954 |

UNITED STATES PATENT OFFICE
CERTIFICATE OF CORRECTION

Patent No. 3,044,514                          July 17, 1962

Carl Schnell

It is hereby certified that error appears in the above numbered patent requiring correction and that the said Letters Patent should read as corrected below.

Column 14, line 12, for "direced" read -- directed --; line 56, for "threat" read -- thereat --.

Signed and sealed this 19th day of November 1963.

(SEAL)
Attest:

ERNEST W. SWIDER

Attesting Officer

EDWIN L. REYNOLDS

Acting Commissioner of Patents